US012604013B2

(12) United States Patent
Hsiao et al.

(10) Patent No.: US 12,604,013 B2
(45) Date of Patent: Apr. 14, 2026

(54) THRESHOLD OF SIMILARITY FOR CANDIDATE LIST

(71) Applicant: MEDIATEK INC., Hsinchu City (TW)

(72) Inventors: Yu-Ling Hsiao, Hsinchu City (TW); Chih-Wei Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/863,413

(22) PCT Filed: May 9, 2023

(86) PCT No.: PCT/CN2023/092993
§ 371 (c)(1),
(2) Date: Nov. 6, 2024

(87) PCT Pub. No.: WO2023/217140
PCT Pub. Date: Nov. 16, 2023

(65) Prior Publication Data
US 2025/0317579 A1 Oct. 9, 2025

Related U.S. Application Data

(60) Provisional application No. 63/339,534, filed on May 9, 2022.

(51) Int. Cl.
*H04N 19/00* (2014.01)
*H04N 19/11* (2014.01)
(Continued)

(52) U.S. Cl.
CPC ........... *H04N 19/176* (2014.11); *H04N 19/11* (2014.11); *H04N 19/139* (2014.11); *H04N 19/159* (2014.11); *H04N 19/51* (2014.11)

(58) Field of Classification Search
CPC ..................................................... H04N 19/00
See application file for complete search history.

(56) References Cited

U.S. PATENT DOCUMENTS 11,729,377 B2 8/2023 Liu
11,736,714 B2 8/2023 Xu
(Continued)

FOREIGN PATENT DOCUMENTS

CN 110891174 A 3/2020
CN 112806010 A 5/2021
(Continued)

OTHER PUBLICATIONS

International Search Report and Written Opinion dated Aug. 9, 2023, issued in application No. PCT/CN2023/092993.
(Continued)

*Primary Examiner* — Maryam A Nasri
(74) *Attorney, Agent, or Firm* — McClure, Qualey & Rodack, LLP

(57) ABSTRACT

A video coder generates a list of candidate prediction vectors for the current block. The video coder prunes the list of candidate prediction vectors by removing a first prediction vector that is within a threshold of a second prediction vector from the list. The threshold has a first value when refinement is enabled and a second value when refinement is not enabled. The video coder selects a candidate prediction vector from the pruned list of candidate prediction vectors. When refinement is enabled, the video coder refines the selected prediction vector and encodes or decodes the current block by using the refined prediction vector to reconstruct the current block. When refinement is not enabled, the video coder encodes or decodes the current block by using the selected prediction vector to reconstruct the current block.

12 Claims, 12 Drawing Sheets

(51) Int. Cl.

| | |
|---|---|
| *H04N 19/139* | (2014.01) |
| *H04N 19/159* | (2014.01) |
| *H04N 19/176* | (2014.01) |
| *H04N 19/51* | (2014.01) |

(56) References Cited

U.S. PATENT DOCUMENTS

| | | | |
|---|---|---|---|
| 11,973,969 B2 | 4/2024 | Robert | |
| 2018/0192071 A1 | 7/2018 | Chuang | |
| 2020/0007889 A1 | 1/2020 | Chao | |
| 2020/0112715 A1 | 4/2020 | Hung | |
| 2021/0274205 A1 | 9/2021 | Park | |
| 2024/0364904 A1* | 10/2024 | Kang | H04N 19/44 |
| 2025/0324085 A1* | 10/2025 | Zhang | H04N 19/154 |

FOREIGN PATENT DOCUMENTS

| | | | |
|---|---|---|---|
| CN | 112806012 A | 5/2021 |
| CN | 113647100 A | 11/2021 |
| EP | 3 560 202 A1 | 10/2019 |

OTHER PUBLICATIONS

Extended European Search Report dated Feb. 24, 2026, issued in application No. EP 23802909.4.

Hsu, C-W., et al.; "Description of SDR video coding technology proposal by MediaTek;" Joint Video Experts Team (JVET) of ITU-T SG 16 WO 3 and ISO/IEC JTC 1/SC 29/WG 11; Apr. 2018; pp. 1-64.

Coban, M., et al.; "Algorithm description of Enhanced Compression Model 4 (ECM 4);" Joint Video Experts Team (JVET) of ITU-T WG 16 WP 3 and ISO/IEC JTC 1/SC 29; Jul. 2021; pp. 1-33.

* cited by examiner

THRESHOLD OF SIMILARITY FOR CANDIDATE LIST

CROSS REFERENCE TO RELATED PATENT APPLICATION(S)

The present disclosure is part of a non-provisional application that claims the priority benefit of U.S. Provisional Patent Application No. 63/339,534 filed on 9 May 2022. Content of above-listed application is herein incorporated by reference.

TECHNICAL FIELD

The present disclosure relates generally to video coding. In particular, the present disclosure relates to methods of coding pixel blocks by creating a candidate list.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments provide a method that use a threshold of similarity to prune a list of prediction candidates prior to performing refinement on the selected candidate. A video coder generates a list of candidate prediction vectors for the current block. The video coder prunes the list of candidate prediction vectors by removing a first prediction vector that is within a threshold of a second prediction vector from the list. The threshold has a first value when refinement is enabled and a second value when refinement is not enabled. The video coder selects a candidate prediction vector from the pruned list of candidate prediction vectors.

When refinement is enabled, the video coder refines the selected prediction vector and encodes or decodes the current block by using the refined prediction vector to reconstruct the current block. When refinement is not enabled, the video coder encodes or decodes the current block by using the selected prediction vector to reconstruct the current block. The list of candidate prediction vectors may be generated according to a prediction mode being used to code the current block. The prediction mode may be merge mode, combined intra-inter prediction (CIIP), geometric prediction mode (GPM), intra-block copy (IBC), or another prediction mode. The selected prediction vector may be a motion vector that references samples in a reference picture, or a block vector that references samples in the current picture.

In some embodiments, the first value of the threshold for when refinement is enabled is greater than the second value of the threshold when refinement is disabled. In some embodiments, the first threshold is the same regardless of the prediction mode used to encode the current block. In some embodiments, the first threshold has different values for different prediction modes. In some embodiments, the video coder performs refinement by the template matching (TM) process, i.e., the selected prediction vector is refined to minimize a cost between template pixels neighboring the current block and the corresponding pixels referenced by the refined prediction vector.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. MV Refinement Based on Template Matching (TM)

Template matching (TM) is a decoder-side MV derivation method to refine the motion information of the current CU by finding the closest match between a template of the current CU (e.g., top and/or left neighbouring blocks of the current CU) in the current picture and a set of pixels (i.e., same size to the template) in a reference picture.

Figure 1:
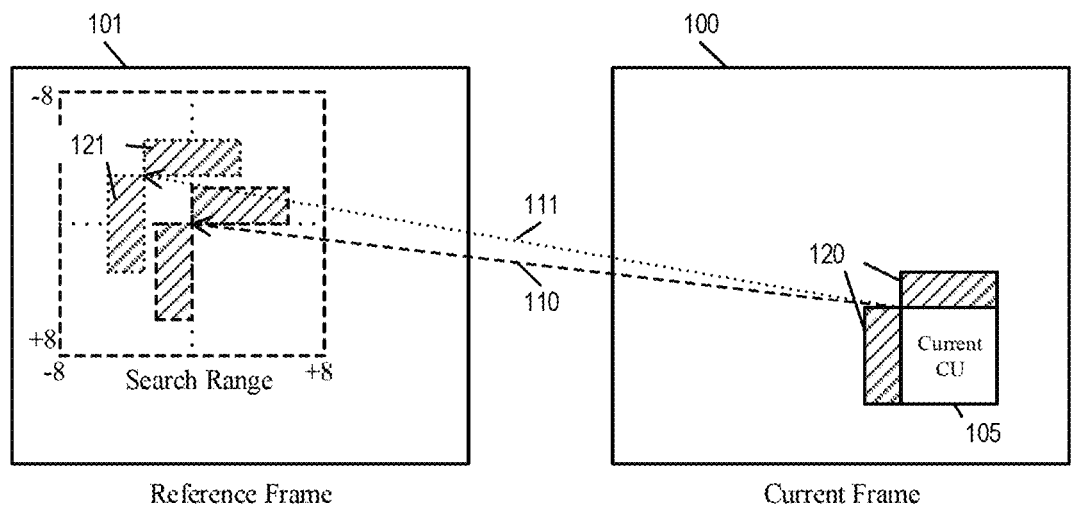
FIG. 1 conceptually illustrates performing template matching based on a search area around an initial motion vector (MV).

FIG. 1 conceptually illustrates performing template matching based on a search area around an initial motion vector (MV). As illustrated, for a current CU 105 in a current picture 100, the video coder searches the reference picture or frame 101 within a [−8, +8]-pel search range around an initial MV 110 for a better or refined MV 111. The search is based on minimizing the difference (or cost) between a current template 120 neighboring the current block 105 and a reference template 121 identified by the refined MV 111. The template matching may be performed with a search step size that is determined based on an adaptive motion vector resolution mode (AMVR). The template matching process can be cascaded with a bilateral matching process in merge modes.

In advanced motion vector prediction (AMVP) mode, an MVP candidate is determined based on template matching error to select the one that reaches the minimum difference between the current block template and the reference block template, and then TM is performed only for this particular MVP candidate for MV refinement. The TM process refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on a AMVR mode search pattern according to Table 1 below.

TABLE 1

| Search pattern | AMVR mode | | | | Merge mode | |
|---|---|---|---|---|---|---|
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

This search process ensures that the MVP candidate still keeps the same MV precision as indicated by the AMVR mode after the TM process. In the search process, if the difference between the previous minimum cost and the current minimum cost in the iteration is less than a threshold that is equal to the area of the block, the search process terminates.

In some embodiments, when using merge mode, the video coder may apply a similar TM search method to refine the merge candidate indicated by the merge index. As Table 1 above shows, TM may be performed all the way down to $\frac{1}{8}$-pel MVD precision or skipping those beyond half-pel MVD precision, depending on whether an alternative interpolation filter (that is used when AMVR is of half-pel mode) is used according to merged motion information. In addition, when TM mode is enabled, template matching may work as an independent process or as an extra MV refinement process between block-based and subblock-based bilateral matching (BM) methods, depending on whether BM can be enabled or not according to its enabling condition check.

II. Multi-Partition Prediction Modes with TM

A. Combined Inter and Intra Prediction (CIIP)

When a CU is coded in merge mode, if the CU contains at least 64 luma samples (that is, CU width times CU height is equal to or larger than 64), and if both CU width and CU height are less than 128 luma samples, an additional flag maybe signaled to indicate if the combined inter/intra prediction (CIIP) mode is applied to the current CU. The CIIP prediction combines an inter prediction signal with an intra prediction signal. In some embodiments, the inter prediction signal in the CIIP mode $P_{inter}$ is derived using the same inter prediction process applied to regular merge mode; and the intra prediction signal $P_{intra}$ is derived following the regular intra prediction process with the planar mode or the one or more intra prediction modes derived from a pre-defined mechanism. The intra and inter prediction signals are combined using weighted averaging, where the weight value is calculated depending on the coding modes of the top and left neighbouring blocks. The CIIP prediction $P_{CIIP}$ is formed as follows: (wt is the weight value)

$$P_{CIIP} = ((4 - wt) * P_{inter} + wt * P_{intra} + 2) \gg 2$$

In some embodiments, a motion candidate selected from a Candidate List I is used to generate $P_{inter}$, and an intra prediction mode selected from a Candidate List II is used to generate $P_{intra}$. In some embodiments, Candidate List I is identical to the Merge candidates list of the current block. In some embodiments, the Candidate List I is a subset of the Merge candidate list.

B. Template-Based Intra Mode Derivation (TIMD)

Template-based intra mode derivation (TIMD) is a coding method in which the intra prediction mode of a CU is implicitly derived by using a neighboring template at both encoder and decoder, instead of the encoder signaling the exact intra prediction mode to the decoder.

In some embodiments, for each intra prediction mode in the MPM list, the SATD between the prediction and reconstructed samples of the template is calculated. First two intra prediction modes with the minimum SATD are selected as the TIMD modes. These two TIMD modes are fused with the weights after applying PDPC process, and such weighted intra prediction is used to code the current CU. Position dependent intra prediction combination (PDPC) is included in the derivation of the TIMD modes.

The costs of two selected modes (mode1 and mode2) are compared with a threshold, in the test the cost factor of 2 is applied as follows:

$$costMode2 < 2 * costMode1$$

If this condition is true, the prediction fusion is applied, otherwise only mode1 is used. Weights of the modes are computed from their SATD costs as follows:

$$weight1 = costMode2/(costMode1 + costMode2)$$
$$weight2 = 1 - weight1$$

In some embodiments, for CIIP mode, the prediction samples are generated by a weighted combination of an inter prediction signal ($P_{inter}$) predicted using a TM-refined CIIP merge candidate and an intra prediction signal ($P_{intra}$) predicted using a TIMD derived intra prediction mode. In some embodiments, the method is only applied to coding blocks with an area less than or equal to 1024.

C. CIIP with TIMD and TM Merge Mode

In some embodiments, the TIMD derivation method is used to derive the intra prediction mode in CIIP. Specifically, the intra prediction mode with the smallest SATD values in the TIMD mode list is selected and mapped to one of the 67 regular intra prediction modes. In some embodiments, the weights (wIntra, wInter) for the two CIIP predictions ($P_{intra}$ and $P_{inter}$) are modified if the TIMD-derived intra prediction mode is an angular mode. In some embodiments, the weights (wIntra, wInter) used for different sub-blocks are modified for angular modes as shown in Table 2:

TABLE 2

| The sub-block index | (wIntra, wInter) |
|---|---|
| 0 | (6, 2) |
| 1 | (5, 3) |
| 2 | (3, 5) |
| 3 | (2, 6) |

With CIIP-TM, a CIIP-TM merge candidate list is built for the CIIP-TM mode. The merge candidates in the CIIP-TM merge candidate list are refined by template matching. The CIIP-TM merge candidates may also be reordered by an adaptive reordering of merge candidates (ARMC) with template matching method as regular merge candidates. (ARMC is a method in which merge candidates are divided into several subgroups, and merge candidates in a subgroup are reordered according to cost values based on template matching.) In some embodiments, the maximum number of CIIP-TM merge candidates is two.

D. Geometric Prediction Mode (GPM)

In VVC, a geometric partitioning mode is supported for inter prediction. The geometric partitioning mode (GPM) is signalled using a CU-level flag as one kind of merge mode, with other merge modes that includes the regular merge mode, the MMVD mode, the CIIP mode, and the subblock merge mode. In total 64 partitions are supported by geometric partitioning mode for each possible CU size $w \times h = 2^m \times 2^n$ with m, n $\in$ {3 . . . 6} excluding 8×64 and 64×8.

Figure 2:
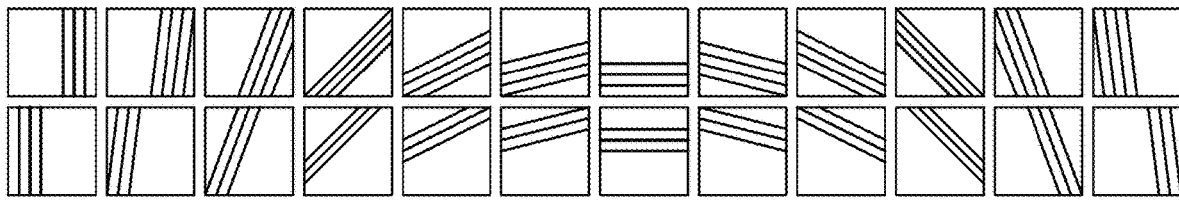
FIG. 2 illustrates the partitioning of a CU by the geometric partitioning mode (GPM).

FIG. 2 illustrates the partitioning of a CU by the geometric partitioning mode (GPM). Each GPM partitioning or GPM split is characterized by a distance-angle pairing that defines a bisecting line. The figure illustrates examples of the GPM splits grouped by identical angles. As illustrated, when GPM is used, a CU is split into two parts by a geometrically located straight line. The location of the splitting line is mathematically derived from the angle and offset parameters of a specific partition.

Each part of a geometric partition in the CU is inter-predicted using its own motion (vector). Only uni-prediction is allowed for each partition, that is, each part has one motion vector and one reference index. The uni-prediction motion constraint is applied to ensure that, similar to conventional bi-prediction, only two motion compensated prediction are performed for each CU.

If GPM is used for the current CU, then a geometric partition index indicating the partition mode of the geometric partition (angle and offset) and two merge indices (one for each partition) are further signalled. The merge index of a geometric partition is used to select a candidate from a uni-prediction candidate list (also referred to as the GPM candidate list). The maximum number of candidates in the GPM candidate list is signalled explicitly in SPS to specify syntax binarization for GPM merge indices. After predicting each of part of the geometric partition, the sample values along the geometric partition edge are adjusted using a blending processing with adaptive weights. This is the prediction signal for the whole CU, and transform and quantization process will be applied to the whole CU as in other prediction modes. The motion field of the CU as predicted by GPM is then stored.

Figure 3:
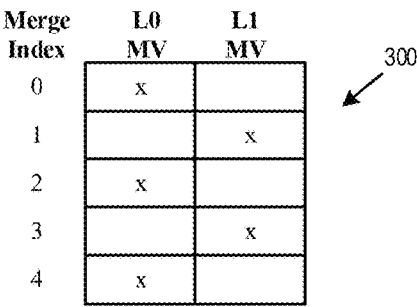
FIG. 3 illustrates an example uni-prediction candidate list for a GPM partition and the selection of a uni-prediction MV for GPM.

The uni-prediction candidate list for a GPM partition (the GPM candidate list) may be derived directly from the merge candidate list of the current CU. FIG. 3 illustrates an example uni-prediction candidate list 300 for a GPM partition and the selection of a uni-prediction MV for GPM. The GPM candidate list 300 is constructed in an even-odd manner with only uni-prediction candidates that alternates between L0 MV and L1 MV. Let n be the index of the uni-prediction motion in the uni-prediction candidate list for GPM. The LX (i.e., L0 or L1) motion vector of the n-th extended merge candidate, with X equal to the parity of n, is used as the n-th uni-prediction motion vector for GPM. (These motion vectors are marked with "x" in the figure.) In case a corresponding LX motion vector of the n-th extended merge candidate does not exist, the L(1−X) motion vector of the same candidate is used instead as the uni-prediction motion vector for GPM.

illustrates an example GPM partition edge blending for a CU 400. In the figure, blending weights are generated based on an initial blending weight $w_0$.

A block being coded by GPM may have one partition coded in inter mode and one partition coded intra mode. Such a GPM mode may be referred to as GPM with intra and inter, or GPM-Intra. In some embodiments, each GPM partition has a corresponding flag in the bitstream to indicate whether the GPM partition is coded by intra or inter prediction. For the GPM partition that is coded inter prediction, the prediction signal is generated by MVs from the merge candidate list of the CU. For the GPM partition that is coded by intra prediction, the prediction signal is generated from the neighboring pixels for the intra prediction mode specified by an index from the encoder. The variation of the possible intra prediction modes may be restricted by the geometric shapes. The final prediction of the GPM coded CU is produced by combining (with blending at partition edge) the prediction of the inter-predicted partition and the prediction of the intra-predicted partition as in regular GPM mode (i.e., having two inter-predicted partitions).

In some embodiments, bi-prediction candidates are allowed into the GPM candidate list by reusing merge candidate list. In some embodiments, the merge candidate list (which includes uni-prediction and/or bi-prediction candidates) is used as the GPM candidate list. In some embodiments, the GPM candidate list that may include bi-prediction candidates (e.g., reusing the merge candidate list) is only allowed in small CU (having size smaller than a threshold) and/or when GPM-Intra (e.g., a GPM mode that combines inter and intra prediction) is enabled in order to constrain motion compensation bandwidth. Otherwise (CU larger than or equal to a threshold), the GPM candidate list is constructed in an even-odd manner with only uni-prediction allowed.

E. GPM with TM

In some embodiments, template matching (TM) may be applied to refine MVs of GPM partitions. When GPM mode is enabled for a CU, a CU-level flag is signaled to indicate whether TM is applied to both geometric partitions. Motion information for each geometric partition is refined using TM. When TM is chosen, a template is constructed using left, above, or left and above neighboring samples according to partition angle. Table 3 below shows Template for the first and second geometric partitions, where A represents using above samples, L represents using left samples, and L+A represents using both left and above samples.

TABLE 3

| Partition angle | 0 | 2 | 3 | 4 | 5 | 8 | 11 | 12 | 13 | 14 |
|---|---|---|---|---|---|---|---|---|---|---|
| 1st partition | A | A | A | A | L + A | L + A | L + A | L + A | A | A |
| 2nd partition | L + A | L + A | L + A | L | L | L | L | L + A | L + A | L + A |
| Partition angle | 16 | 18 | 19 | 20 | 21 | 24 | 27 | 28 | 29 | 30 |
| 1st partition | A | A | A | A | L + A | L + A | L + A | L + A | A | A |
| 2nd partition | L + A | L + A | L + A | L | L | L | L | L + A | L + A | L + A |

Figure 4:
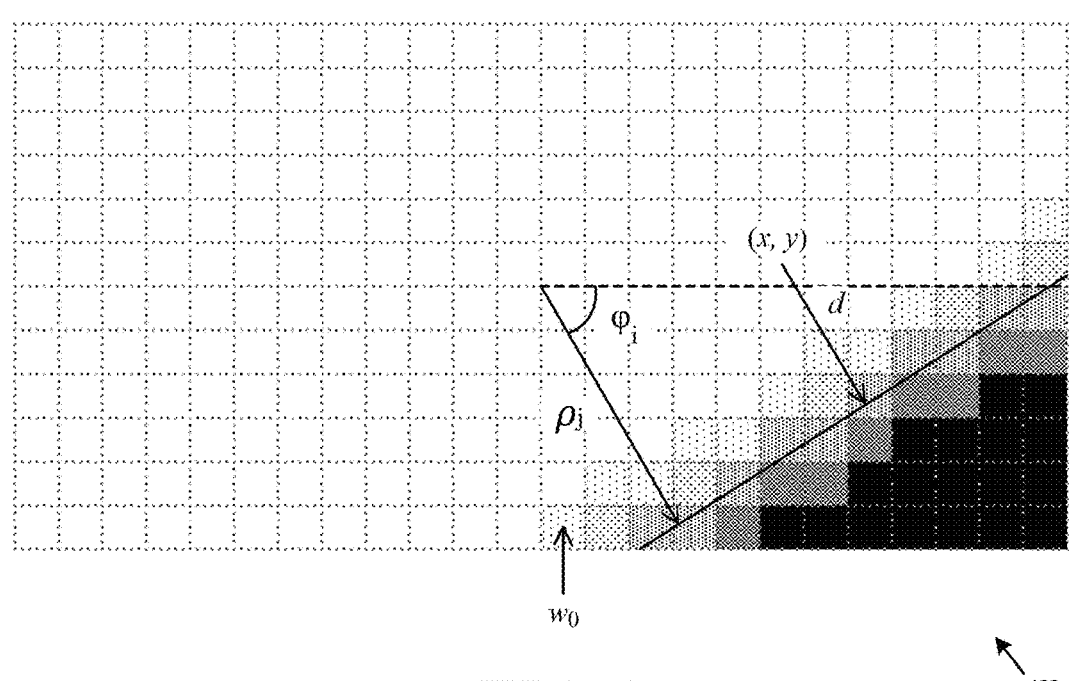
FIG. 4 illustrates an example GPM partition edge blending for a CU.

As mentioned, the sample values along the geometric partition edge are adjusted using a blending processing with adaptive weights. Specifically, after predicting each part of a geometric partition using its own motion, blending is applied to the two prediction signals to derive samples around geometric partition edge. The blending weight for each position of the CU are derived based on the distance between individual position and the partition edge. FIG. 4

The motion is then refined by minimizing the difference between the current template and the template in the reference picture using the same search pattern of merge mode with half-pel interpolation filter disabled. A GPM candidate list is constructed as follows: (1) the video coder derives interleaved List-0 MV candidates and List-1 MV candidates directly from the regular merge candidate list, where List-0 MV candidates are higher priority than List-1 MV candidates. A pruning method with an adaptive threshold based on the current CU size is applied to remove redundant MV candidates; (2) the video coder further derives interleaved List-1 MV candidates and List-0 MV candidates directly from the regular merge candidate list, where List-1 MV candidates are higher priority than List-0 MV candidates. The same pruning method with the adaptive threshold is also applied to remove redundant MV candidates; and (3) the video coder pads the GPM candidate list with zero MV candidates until the GPM candidate list is full.

In some embodiments, the GPM-MMVD and GPM-TM are exclusively enabled to one CU for which GPM is used. In some embodiments, this is done by firstly signaling the GPM-MMVD syntax. When both of the two GPM-MMVD control flags are set to false (i.e., the GPM-MMVD are disabled for two GPM partitions), the GPM-TM flag is signaled to indicate whether the template matching is applied to the two GPM partitions. Otherwise (at least one GPM-MMVD flag is set to true), the value of the GPM-TM flag is inferred to be false.

III. Intra Block Copy (IBC) Mode

Intra Block Copy (IBC) is also referred to as Current Picture Referencing (CPR). An IBC (or CPR) motion vector is one that refers to the already-reconstructed reference samples in the current picture. For some embodiments, IBC prediction mode is treated as the third prediction mode other than intra or inter prediction modes for coding a CU.

Since IBC mode is implemented as a block level coding mode, block matching (BM) is performed at the encoder to find the optimal block vector (or motion vector) for each CU. Here, a block vector (BV) is used to indicate the displacement from the current block to a reference block, which is already reconstructed inside the current picture. The luma block vector of an IBC-coded CU is in integer precision.

The chroma block vector rounds to integer precision as well. When combined with AMVR, the IBC mode can switch between 1-pel and 4-pel motion vector precisions. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed. In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs. At CU level, IBC mode is signaled with a flag that can be signaled as IBC AMVP mode or IBC skip/merge mode.

IV. Pruning Candidate List for TM

Some embodiments of the disclosure provide a method for improving coding efficiency of prediction vector refinement by TM. A prediction vector may refer to a motion vector (MV) that references pixels in a reference picture, or a block vector (BV) that references pixels in the current picture. Specifically, when TM is used to refine a prediction vector (e.g., MV or BV) for generating a prediction (for Skip, Merge, Direct, IBC, CIIP, GPM, etc.), the candidate list from which the prediction vector is selected, is pruned by applying a similarity check. The similarity check removes from the candidate list candidates that are too similar to at least one other candidate in the list. In some embodiments, the similarity check is based on a threshold of similarity, such that a candidate prediction vector that is within the threshold of similarity from another prediction vector is removed from the candidate list. In some embodiments, the threshold of similarity is set to prevent the candidate list from having two or more candidates that are refined to be the same prediction vector by the refinement process (e.g., TM process, boundary matching process, or another refinement process.)

In some embodiments, the video coder applies the threshold of similarity whenever TM refinement is enabled for the current block. The threshold may be predefined or signaled by a syntax element in the bitstream.

Figure 5A:
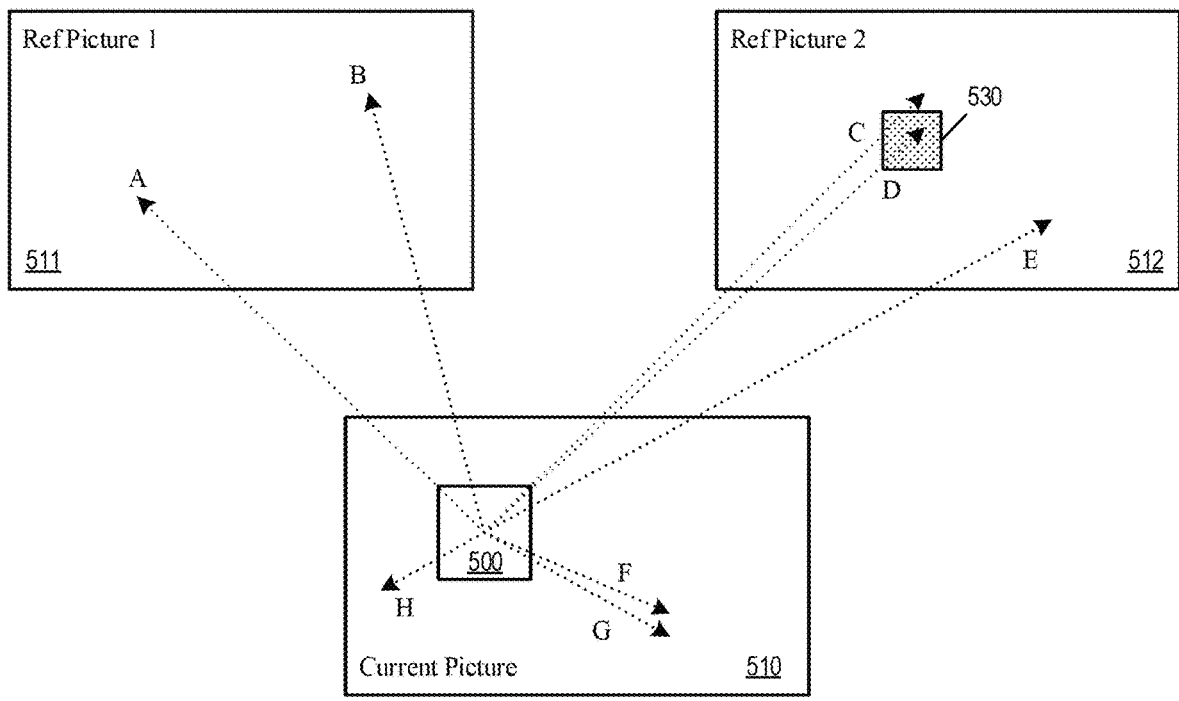
FIGS. 5A-C conceptually illustrate using a threshold of similarity to prune a candidate list for subsequent refinement based on whether the selected candidate is to be refined.
Figure 5A:
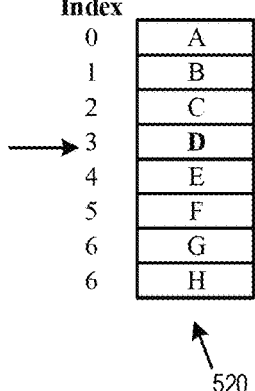
Figure 5B:
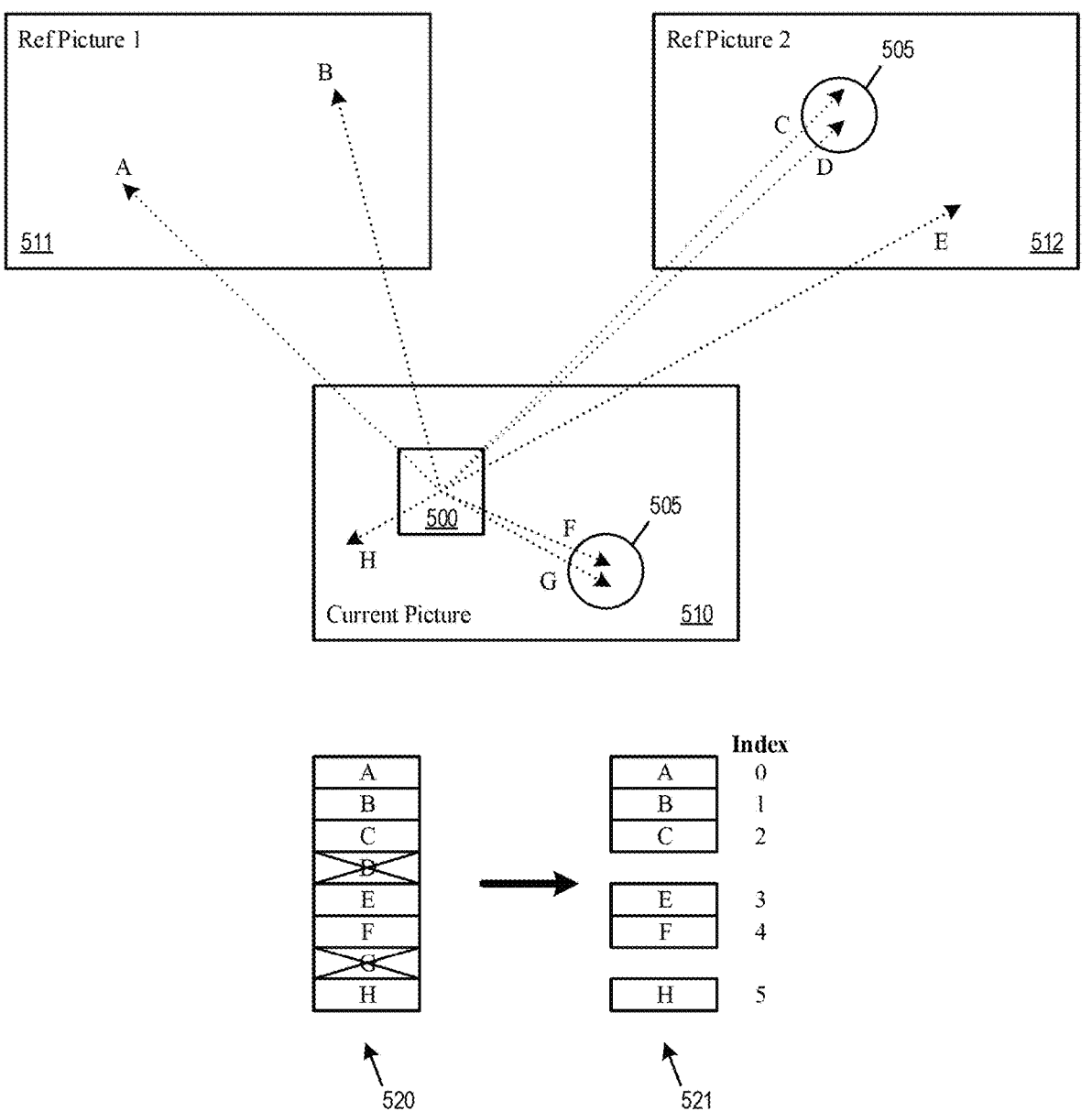
Figure 5C:
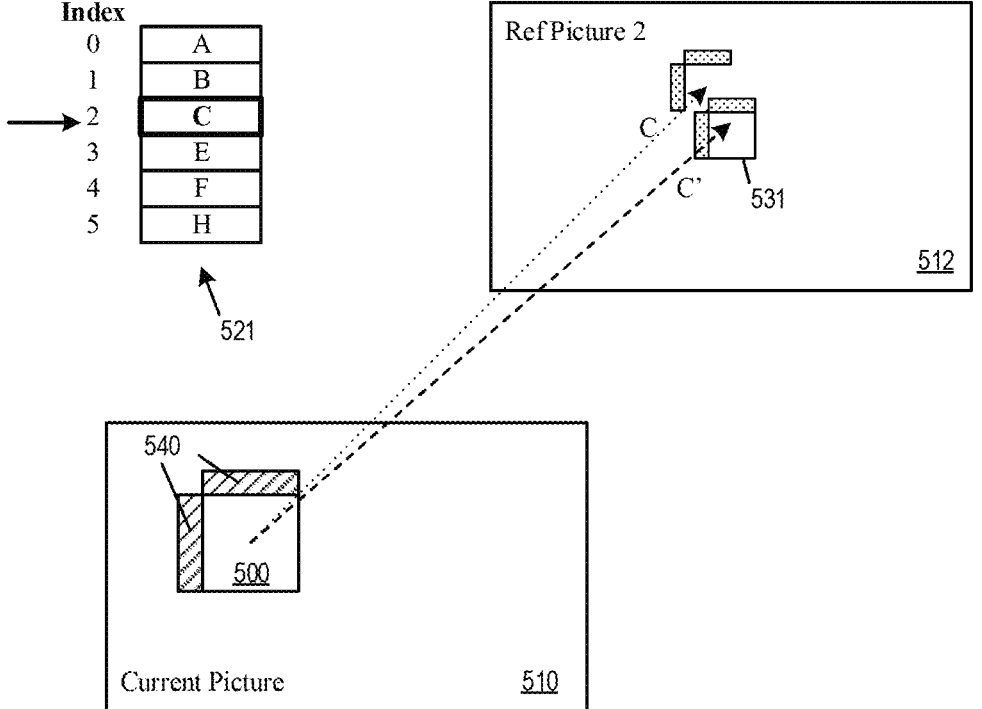

FIGS. 5A-C conceptually illustrate using a threshold of similarity to prune a candidate list for subsequent refinement based on whether the selected candidate is to be refined. The figures illustrate a current block 500 in a current picture 510. The current block 500 is to be encoded or decoded by a prediction mode or coding tool that performs prediction by using a prediction vector to fetch pixels as a predictor or prediction samples for the current block. Such a coding tool or prediction mode can be any one of merge mode, CIIP, GPM, IBC, etc.

The coding tool chosen to encode or decode the current block uses a list of candidates 520 that initially includes candidates A through H. The candidates A through H include predictor vectors (MVs and/or BVs) that references samples in the current picture 510 and reference pictures 511 and 512. Specifically, candidates A and B are MVs referencing samples in the reference picture 511. Candidates C, D, and E are MVs referencing samples in the reference picture 512. Candidates F, G, and H are BVs referencing samples in the current picture 510.

FIG. 5A illustrates the video coder performing prediction based on the candidate list 520 without refinement. The video coder does not perform pruning (or perform pruning with a very small threshold) on the candidate list 520, and candidate D is selected from the candidate list 520. Candidate D is used to fetch prediction samples 530 without refinement. The predictor 530 is then used to encode the current block 500.

FIG. 5B illustrates the video coder pruning the candidate list 520 when refinement is enabled. With refinement is enabled, the video coder applies a threshold of similarity 505 to prune the candidates list 520. In some embodiments, this threshold 505 is set for identifying prediction vectors that are too similar and may be refined to become the same. In the example, the difference between the MVs C and D is less than the threshold 505 so candidate D is pruned off from the candidate list 520. The difference between the BVs F and G is also less than the threshold 505 so candidate G is also pruned off from the candidate list 520. A pruned candidate list 521 is created without candidates D and G. The prediction of the current block 500 will be based on a candidate that is selected from the pruned candidate list 521.

FIG. 5C illustrates the video coder performing prediction based on the pruned candidate list 521 with refinement enabled. In the example, candidate C is selected from the pruned candidate list 521. The video coder performs template matching (TM) process to refine the MV C into MV C', based on a template 540 of above and left pixels neighboring the current block 500. The refined MV C' is then used to fetch prediction samples 531 from the reference picture 512 for coding the current block 500.

In some embodiments, the threshold of similarity is the same for different prediction modes when TM is used. For example, the threshold is the same for regular merge mode with TM, CIIP mode with TM, GPM mode with TM, etc.

In some embodiments, the threshold of similarity for candidates of a coding/prediction mode with TM enabled is different than that without TM enabled. For example, the threshold for regular merge mode (or CIIP mode or GPM mode) without TM enabled and the threshold for regular merge mode (or CIIP mode or GPM mode) with TM enabled are different. Or the threshold for regular merge mode without TM enabled is smaller than the threshold for regular merge mode with TM enabled. Or the threshold for regular merge mode without TM enabled is larger than the threshold for regular merge mode with TM enabled. In some embodiments, when TM is not enabled, the threshold of similarity is set to zero or a very small value so no candidate is pruned off.

The foregoing proposed method can be implemented in encoders and/or decoders. For example, the proposed method can be implemented in a inter prediction module and/or intra block copy prediction module of an encoder, and/or a inter prediction module (and/or intra block copy prediction module) of a decoder.

V. Example Video Encoder

Figure 6:
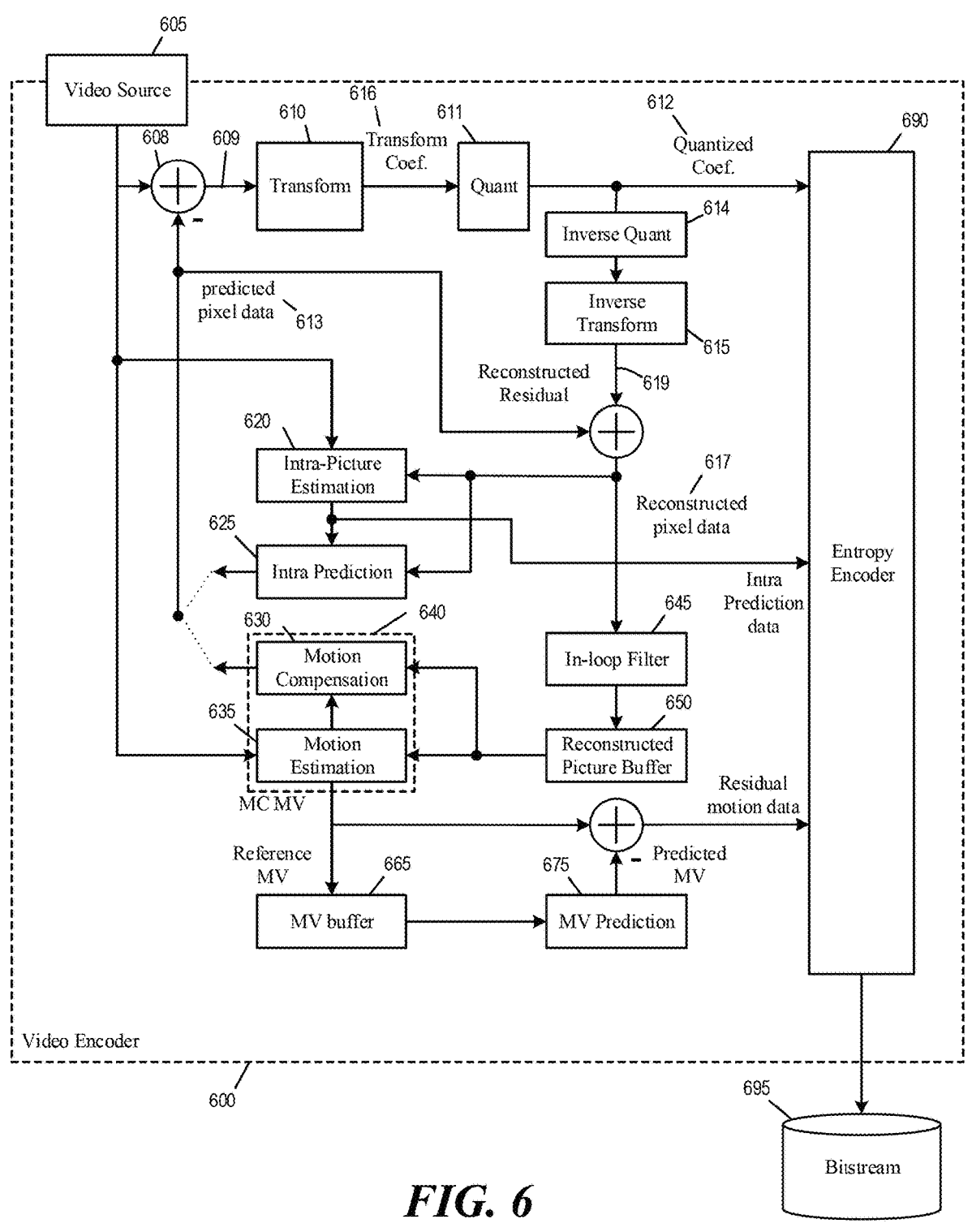
FIG. 6 illustrates an example video encoder that may prune a prediction candidate list based on a similarity threshold.

FIG. 6 illustrates an example video encoder 600 that may prune a prediction candidate list based on a similarity threshold. As illustrated, the video encoder 600 receives input video signal from a video source 605 and encodes the signal into bitstream 695. The video encoder 600 has several components or modules for encoding the signal from the video source 605, at least including some components selected from a transform module 610, a quantization module 611, an inverse quantization module 614, an inverse transform module 615, an intra-picture estimation module 620, an intra-prediction module 625, a motion compensation module 630, a motion estimation module 635, an in-loop filter 645, a reconstructed picture buffer 650, a MV buffer 665, and a MV prediction module 675, and an entropy encoder 690. The motion compensation module 630 and the motion estimation module 635 are part of an inter-prediction module 640.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from the motion compensation module 630 or intra-prediction module 625 as prediction residual 609. The transform module 610 converts the difference (or the residual pixel data or residual signal 608) into transform coefficients (e.g., by performing Discrete Cosine Transform, or DCT). The quantization module 611 quantizes the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the predicted pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data.

Instead of encoding the complete actual MVs in the bitstream, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes various header elements, flags, along with the quantized transform coefficients 612, and the residual motion data as syntax elements into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering or smoothing operations performed by the in-loop filter 645 include deblock filter (DBF), sample adaptive offset (SAO), and/or adaptive loop filter (ALF).

Figure 7:
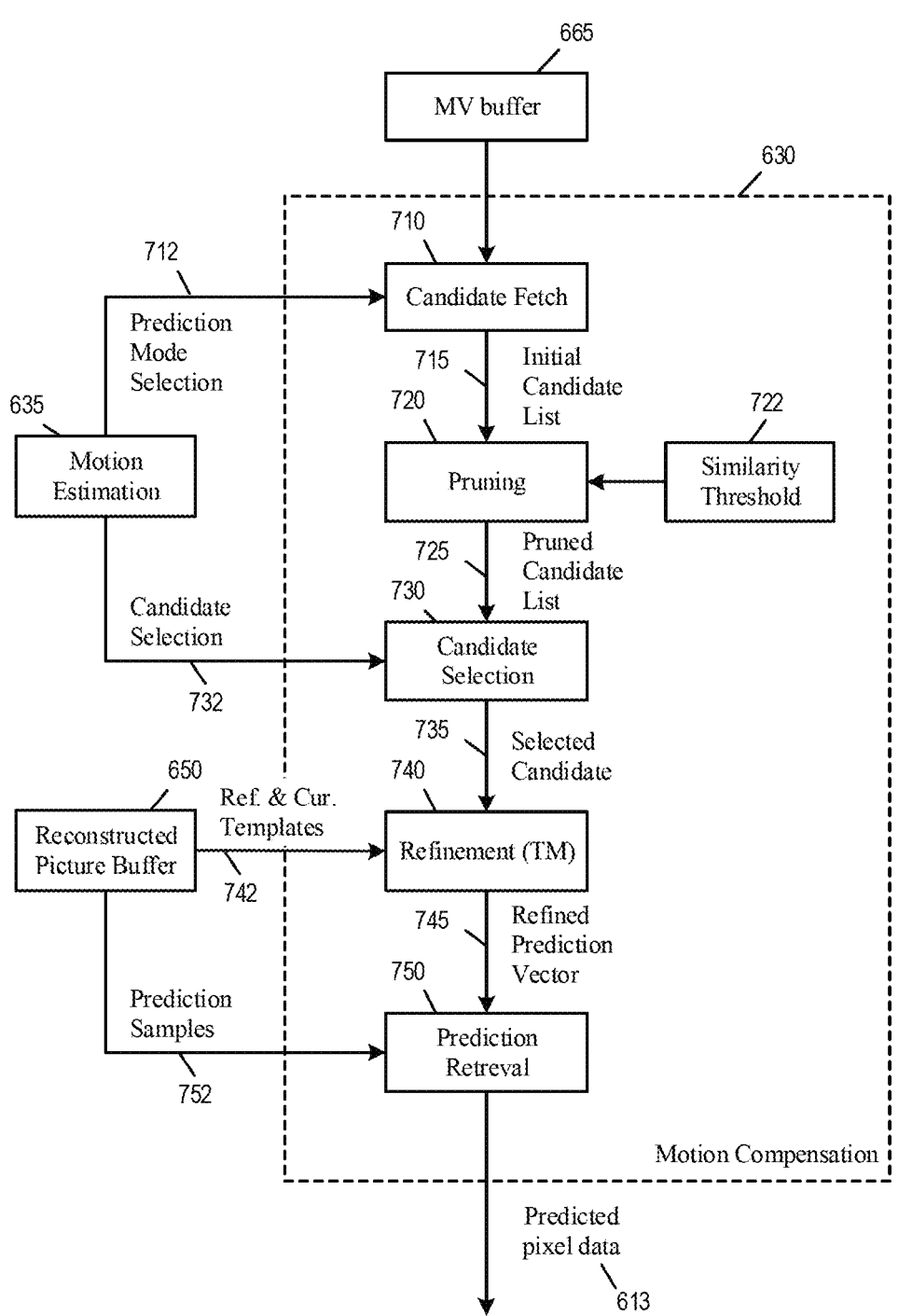
FIG. 7 illustrates portions of the video encoder that implement candidate list pruning and prediction vector refinement.

FIG. 7 illustrates portions of the video encoder 600 that implement candidate list pruning and prediction vector refinement. Specifically, the figure illustrates the components of the motion compensation module 630 of the video encoder 600.

The motion compensation module 630 retrieves (at a "candidate fetch" block 710) existing motion vectors and/or block vectors from the MV buffer 665 to form an initial candidate list 715 for a prediction mode 712. The prediction mode (e.g., merge mode, CIIP, GPM, IBC, etc.) is specified by the motion estimation module 635 and signaled in the bitstream 695 by the entropy encoder 690.

The motion compensation module 630 prunes (at a "pruning" block 720) the candidate list 715 based on a similarity threshold 722, such that a prediction vector that is within the similarity threshold of another prediction vector in the candidate list will be pruned off the candidate list. The result of the pruning operation is a pruned candidate list 725. In some embodiments, the value of the similarity threshold 722 is determined based on whether refinement will be performed on the to be selected candidate prediction vector. For example, when TM refinement is to be performed on the selected candidate, the value of the threshold may be greater than when TM refinement is not performed.

The motion compensation module 630 selects (at a "candidate selection" block 730) a candidate prediction vector 735 from the pruned candidate list 725. A candidate selection 732 may be provided by the motion estimation module 635. The motion compensation module 630 refines (at a "refinement" block 740) the selected prediction vector 735 into a refined prediction vector 745 by searching the content 742 of the reconstructed picture buffer 650. The refinement may be TM refinement based on minimizing the difference between a current template neighboring the current block and a reference template in the reference picture referred by the prediction vector. TM refinement is described by reference to FIG. 1 above.

The refined prediction vector 745 is used by the motion compensation module 630 to retrieve (at a "prediction retrieval" block 750) prediction samples 752 from the reconstructed picture buffer 650. The motion compensation module 630 generates the predicted pixel data 613 based on the retrieved prediction samples 752 according to the prediction mode 712 (by e.g., generating a weighted sum of inter prediction samples and intra prediction samples for CIIP mode).

Figure 8:
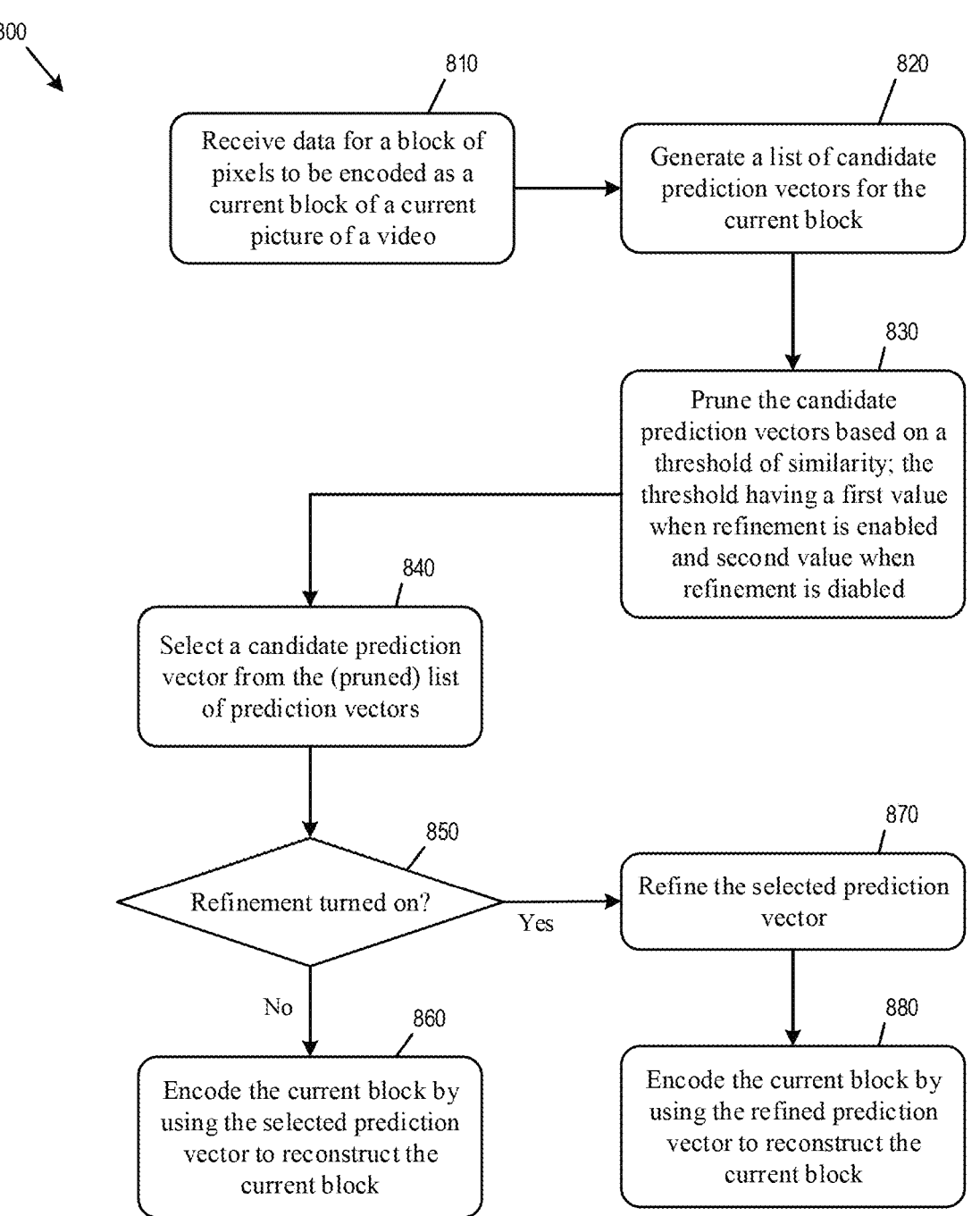
FIG. 8 conceptually illustrates a process that prunes a list of candidate prediction vectors based on a threshold of similarity when encoding a block of pixels.

FIG. 8 conceptually illustrates a process 800 that prunes a list of candidate prediction vectors based on a threshold of similarity when encoding a block of pixels. In some embodiments, one or more processing units (e.g., a processor) of a computing device implementing the encoder 600 performs the process 800 by executing instructions stored in a computer readable medium. In some embodiments, an electronic apparatus implementing the encoder 600 performs the process 800.

The encoder receives (at block 810) data to be encoded as a current block of pixels in a current picture of a video. The encoder generates (at block 820) a list of candidate prediction vectors for the current block. The list of candidate prediction vectors may be generated according to a prediction mode being used to code the current block. The prediction mode may be merge mode, combined intra-inter prediction (CIIP), geometric prediction mode (GPM), intra-block copy (IBC), or another prediction mode.

The encoder prunes (at block 830) the list of candidate prediction vectors by removing a first prediction vector that is within a threshold of a second prediction vector from the list. The threshold has a first value when refinement is enabled and a second value when refinement is not enabled. In some embodiments, the first value of the threshold for when refinement is enabled is greater than the second value of the threshold when refinement is disabled. In some embodiments, the first threshold is the same regardless of the prediction mode used to encode the current block. In some embodiments, the first threshold has different values for different prediction modes. (In some embodiments, the refinement being enabled is the TM refinement process.)

The encoder selects (at block 840) a candidate prediction vector from the pruned list of candidate prediction vectors. The selected prediction vector may be a motion vector that references samples in a reference picture, or a block vector that references samples in the current picture.

The encoder determines (at block 850) whether refinement is enabled for the current block. If refinement is enabled, the process proceeds to 870. If refinement is not enabled, the encoder encodes (at block 860) the current block by using the selected prediction vector to reconstruct the current block.

At block 870, the encoder refines the selected prediction vector. In some embodiments, the encoder performs refinement by the TM process, i.e., the selected prediction vector is refined to minimize a cost between template pixels neighboring the current block and corresponding pixels referenced by the refined prediction vector. The encoder then encodes (at block 880) the current block by using the refined prediction vector to reconstruct the current block and produce prediction residuals. The selected prediction vector may be used to construct a predictor for the current block according to the prediction mode of the current block.

VI. Example Video Decoder

In some embodiments, an encoder may signal (or generate) one or more syntax element in a bitstream, such that a decoder may parse said one or more syntax element from the bitstream.

Figure 9:
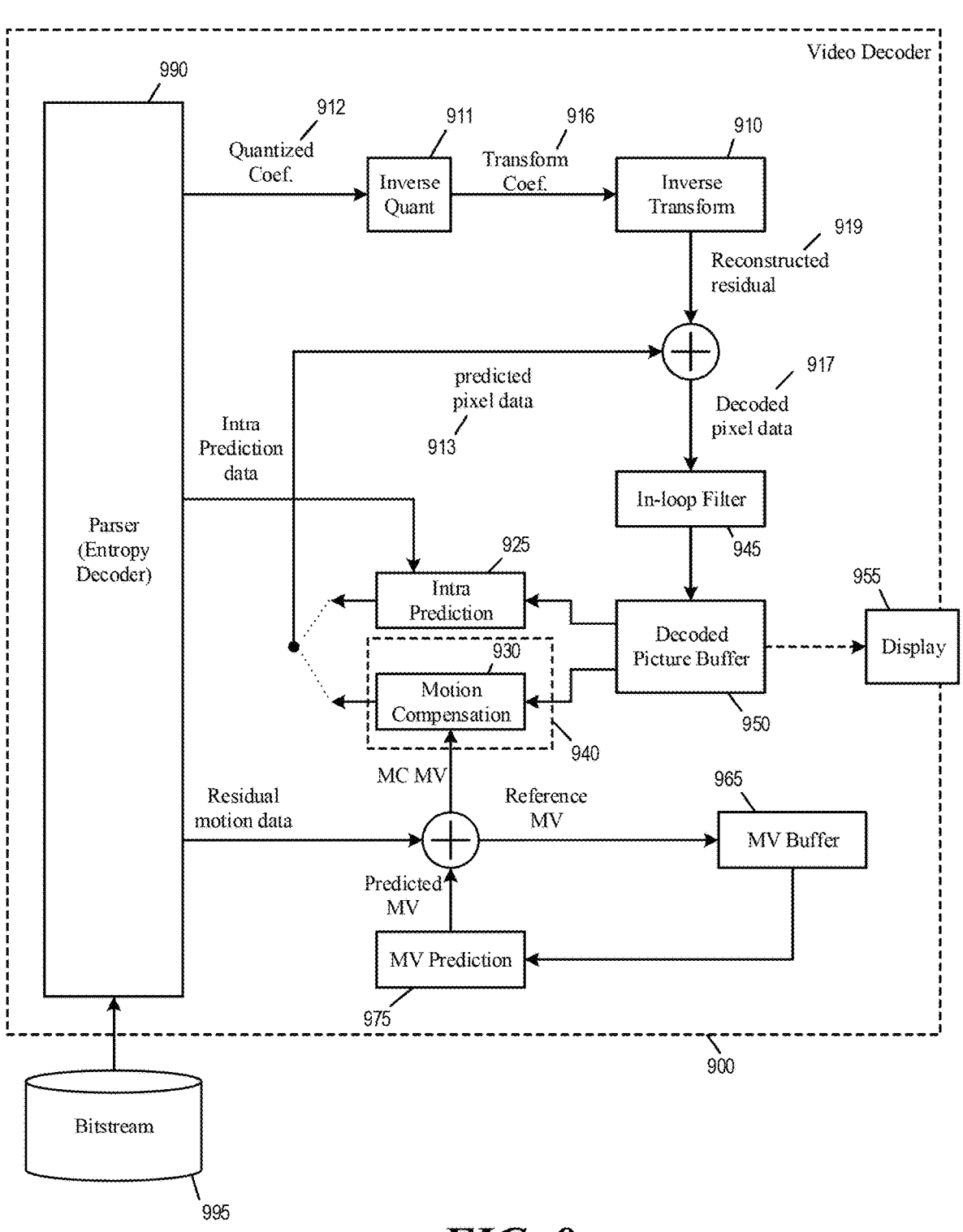
FIG. 9 illustrates an example video decoder that may prune a prediction candidate list based on a similarity threshold.

FIG. 9 illustrates an example video decoder 900 that may prune a prediction candidate list based on a similarity threshold. As illustrated, the video decoder 900 is an image-decoding or video-decoding circuit that receives a bitstream 995 and decodes the content of the bitstream into pixel data of video frames for display. The video decoder 900 has several components or modules for decoding the bitstream 995, including some components selected from an inverse quantization module 911, an inverse transform module 910, an intra-prediction module 925, a motion compensation module 930, an in-loop filter 945, a decoded picture buffer 950, a MV buffer 965, a MV prediction module 975, and a parser 990. The motion compensation module 930 is part of an inter-prediction module 940.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman encoding.

The inverse quantization module 911 de-quantizes the quantized data (or quantized coefficients) 912 to obtain transform coefficients, and the inverse transform module 910 performs inverse transform on the transform coefficients 916 to produce reconstructed residual signal 919. The reconstructed residual signal 919 is added with predicted pixel data 913 from the intra-prediction module 925 or the motion compensation module 930 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly, or retrieves the content of the decoded picture buffer to a display buffer. In some embodiments, the display device receives pixel values from the decoded picture buffer 950 through a pixel transport.

The motion compensation module 930 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering or smoothing operations performed by the in-loop filter 945 include deblock filter (DBF), sample adaptive offset (SAO), and/or adaptive loop filter (ALF).

Figure 10:
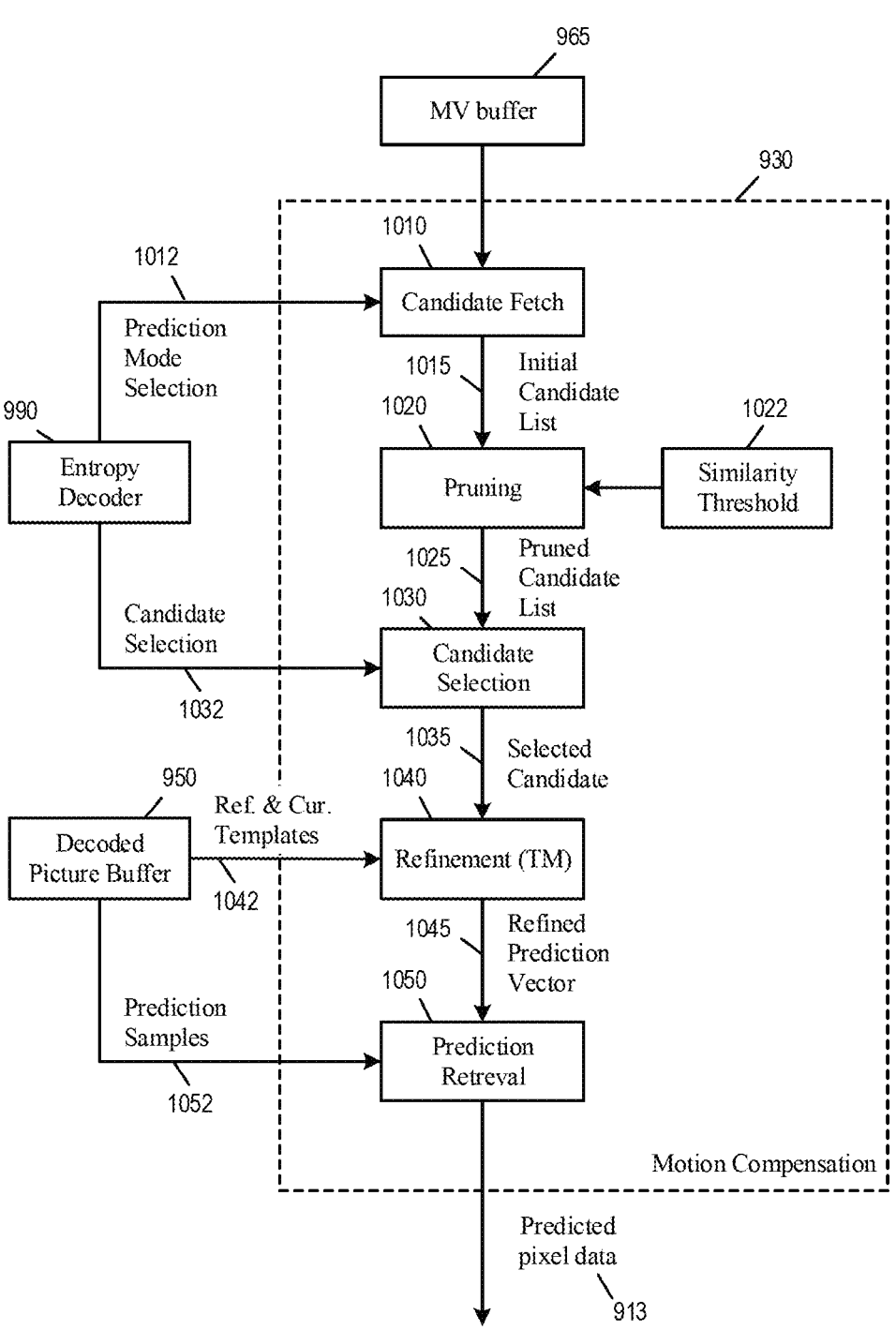
FIG. 10 illustrates portions of the video decoder that implement candidate list pruning and prediction vector refinement.

FIG. 10 illustrates portions of the video decoder 900 that implement candidate list pruning and prediction vector refinement. Specifically, the figure illustrates the components of the motion compensation module 930 of the video decoder 900.

The motion compensation module 930 retrieves (at a "candidate fetch" block 1010) existing motion vectors and/ or block vectors from the MV buffer 965 to form an initial candidate list 1015 for a prediction mode 1012. The prediction mode (e.g., merge mode, CIIP, GPM, IBC, etc.) is specified by the entropy decoder 990 according to syntax elements in the bitstream 995.

The motion compensation module 930 prunes (at a "pruning" block 1020) the candidate list 1015 based on a similarity threshold 1022, such that a prediction vector that is within the similarity threshold of another prediction vector in the candidate list will be pruned off the candidate list. The result of the pruning operation is a pruned candidate list 1025. In some embodiments, the value of the similarity threshold 1022 is determined based on whether refinement will be performed on the to be selected candidate prediction vector. For example, when TM refinement is to be performed on the selected candidate, the value of the threshold may be greater than when TM refinement is not performed.

The motion compensation module 930 selects (at a "candidate selection" block 1030) a candidate prediction vector 1035 from the pruned candidate list 1025. A candidate selection 1032 may be provided by the entropy decoder 990. The motion compensation module 930 refines (at a "refinement" block 1040) the selected prediction vector 1035 into a refined prediction vector 1045 by searching the content 1042 of the decoded picture buffer 950. The refinement may be TM refinement based on minimizing the difference between a current template neighboring the current block and a reference template in the reference picture referred by the prediction vector. TM refinement is described by reference to FIG. 1 above.

The refined prediction vector 1045 is used by the motion compensation module 930 to retrieve (at a "prediction retrieval" block 1050) prediction samples 1052 from the decoded picture buffer 950. The motion compensation module 930 generates the predicted pixel data 913 based on the retrieved prediction samples 1052 according to the prediction mode 1012 (by e.g., generating a weighted sum of inter prediction samples and intra prediction samples for CIIP mode).

Figure 11:
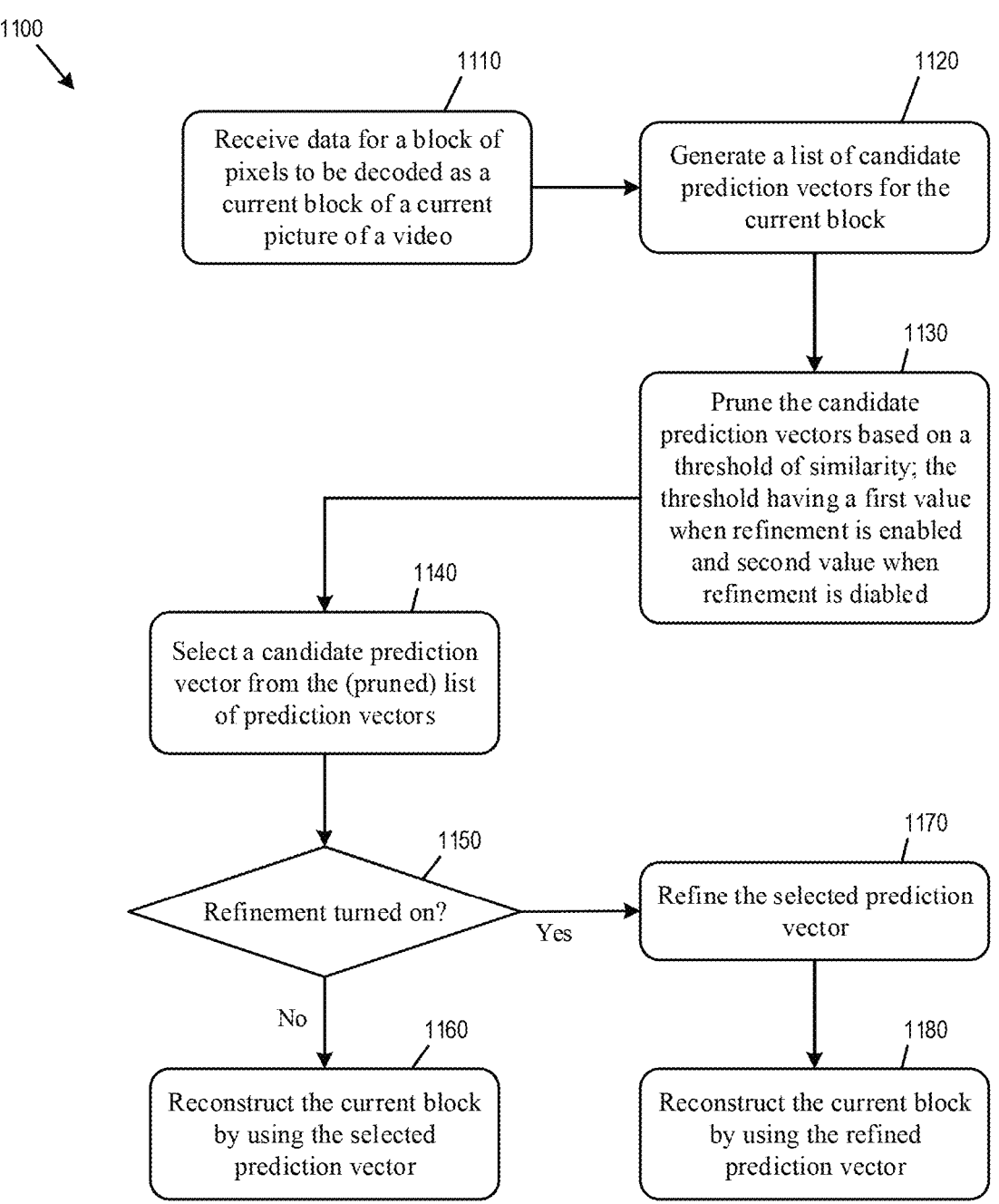
FIG. 11 conceptually illustrates a process that prunes a list of candidate prediction vectors based on a threshold of similarity when encoding a block of pixels.

FIG. 11 conceptually illustrates a process 1100 that prunes a list of candidate prediction vectors based on a threshold of similarity when encoding a block of pixels. In some embodiments, one or more processing units (e.g., a processor) of a computing device implementing the decoder 900 performs the process 1100 by executing instructions stored in a computer readable medium. In some embodiments, an electronic apparatus implementing the decoder 900 performs the process 1100.

The decoder receives (at block 1110) data to be decoded as a current block of pixels in a current picture of a video. The decoder generates (at block 1120) a list of candidate prediction vectors for the current block. The list of candidate prediction vectors may be generated according to a prediction mode being used to code the current block. The prediction mode may be merge mode, combined intra-inter prediction (CIIP), geometric prediction mode (GPM), intrablock copy (IBC), or another prediction mode.

The decoder prunes (at block 1130) the list of candidate prediction vectors by removing a first prediction vector that is within a threshold of a second prediction vector from the list. The threshold has a first value when refinement is enabled and a second value when refinement is not enabled. In some embodiments, the first value of the threshold for when refinement is enabled is greater than the second value of the threshold when refinement is disabled. In some embodiments, the first threshold is the same regardless of the prediction mode used to decode the current block. In some embodiments, the first threshold has different values for different prediction modes. (In some embodiments, the refinement being enabled is the TM refinement process.)

The decoder selects (at block 1140) a candidate prediction vector from the pruned list of candidate prediction vectors. The selected prediction vector may be a motion vector that references samples in a reference picture, or a block vector that references samples in the current picture.

The decoder determines (at block 1150) whether refinement is enabled for the current block. If refinement is enabled, the process proceeds to 1170. If refinement is not enabled, the decoder decodes (at block 1160) the current block by using the selected prediction vector to reconstruct the current block.

At block 1170, the decoder refines the selected prediction vector. In some embodiments, the decoder performs refinement by the TM process, i.e., the selected prediction vector is refined to minimize a cost between template pixels neighboring the current block and corresponding pixels referenced by the refined prediction vector. The decoder then decodes (at block 1180) the current block by using the refined prediction vector to reconstruct the current block and produce prediction residuals. The selected prediction vector may be used to construct a predictor for the current block according to the prediction mode of the current block. The decoder may then provide the reconstructed current block for display as part of the reconstructed current picture.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 12:
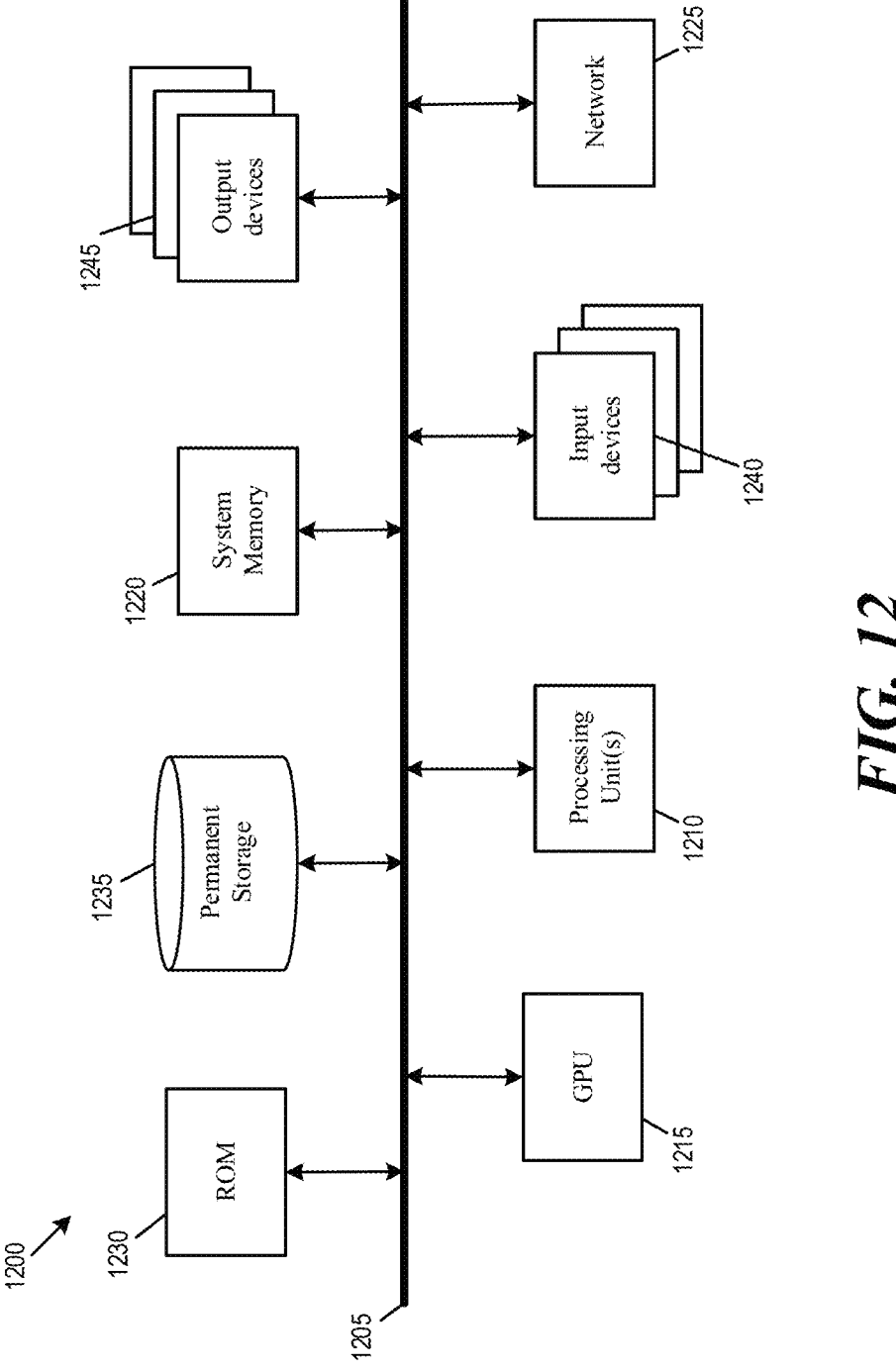
FIG. 12 conceptually illustrates an electronic system with which some embodiments of the present disclosure are implemented.

FIG. 12 conceptually illustrates an electronic system 1200 with which some embodiments of the present disclosure are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics-processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the GPU 1215, the read-only memory 1230, the system memory 1220, and the permanent storage device 1235.

From these various memory units, the processing unit(s) 1210 retrieves instructions to execute and data to process in order to execute the processes of the present disclosure. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are used by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the present disclosure use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor uses at runtime. In some embodiments, processes in accordance with the present disclosure are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alpha-numeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 8 and FIG. 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:
receiving data for a block of pixels to be encoded or decoded as a current block of a current picture of a video;
generating a list of candidate prediction vectors for the current block;
pruning the list of candidate prediction vectors by removing a first prediction vector that is within a threshold of a second prediction vector from the list, wherein the threshold has a first value when refinement is enabled and a second value when refinement is not enabled;
selecting a candidate prediction vector from the pruned list of candidate prediction vectors;
when refinement is enabled:
refining the selected prediction vector; and
encoding or decoding the current block by using the refined prediction vector to reconstruct the current block; and
when refinement is not enabled:
encoding or decoding the current block by using the selected prediction vector to reconstruct the current block.

2. The video coding method of claim 1, wherein the selected prediction vector is a motion vector that references samples in a reference picture.

3. The video coding method of claim 1, wherein the selected prediction vector is a block vector that references samples in the current picture.

4. The video coding method of claim 1, wherein the selected prediction vector is refined to minimize a cost between template pixels neighboring the current block and corresponding pixels referenced by the refined prediction vector.

5. The video coding method of claim 1, wherein the selected prediction vector is used to construct a predictor for the current block according to a prediction mode.

6. The video coding method of claim 5, wherein the prediction mode is one of merge mode, combined intra-inter prediction (CIIP), geometric prediction mode (GPM), and intra-block copy (IBC).

7. The video coding method of claim 6, wherein the first threshold is the same regardless of the prediction mode used to code the current block.

8. The video coding method of claim 6, wherein the first threshold has different values for different prediction modes.

9. The video coding method of claim 1, wherein the first value of the threshold for when refinement is enabled is greater than the second value of the threshold when refinement is disabled.

10. An electronic apparatus comprising:
a video coder circuit configured to perform operations comprising:
receiving data for a block of pixels to be encoded or decoded as a current block of a current picture of a video;
generating a list of candidate prediction vectors for the current block;
pruning the list of candidate prediction vectors by removing a first prediction vector that is within a threshold of a second prediction vector from the list, wherein the threshold has a first value when refinement is enabled and a second value when refinement is not enabled;
selecting a candidate prediction vector from the pruned list of candidate prediction vectors;
when refinement is enabled:
refining the selected prediction vector; and
encoding or decoding the current block by using the refined prediction vector to reconstruct the current block; and
when refinement is not enabled:
encoding or decoding the current block by using the selected prediction vector to reconstruct the current block.

11. A video decoding method comprising:
receiving data for a block of pixels to be decoded as a current block of a current picture of a video;
generating a list of candidate prediction vectors for the current block;
pruning the list of candidate prediction vectors by removing a first prediction vector that is within a threshold of a second prediction vector from the list, wherein the threshold has a first value when refinement is enabled and a second value when refinement is not enabled;
selecting a candidate prediction vector from the pruned list of candidate prediction vectors;
when refinement is enabled:
refining the selected prediction vector; and
reconstructing the current block by using the refined prediction vector to generate a prediction block; and
when refinement is not enabled:
reconstructing the current block by using the selected prediction vector to generate a prediction block.

12. A video encoding method comprising:
receiving data for a block of pixels to be encoded as a current block of a current picture of a video;
generating a list of candidate prediction vectors for the current block;
pruning the list of candidate prediction vectors by removing a first prediction vector that is within a threshold of a second prediction vector from the list, wherein the threshold has a first value when refinement is enabled and a second value when refinement is not enabled;
selecting a candidate prediction vector from the pruned list of candidate prediction vectors;

when refinement is enabled:

refining the selected prediction vector; and encoding the current block by using the refined prediction vector to generate a prediction block; and when refinement is not enabled:

encoding the current block by using the selected prediction vector to generate a prediction block.

* * * * *